United States Patent
Riley et al.

[11] Patent Number: 5,967,891
[45] Date of Patent: Oct. 19, 1999

[54] AIR VENT FOR A HEATING OR AIR CONDITIONING SYSTEM

[75] Inventors: Joseph Riley, Kalamazoo, Mich.; Keith Malcolm Evans, Hadleigh, United Kingdom

[73] Assignee: Ford Motor Company, Dearborn, Mich.

[21] Appl. No.: 08/995,491

[22] Filed: Dec. 22, 1997

[51] Int. Cl.⁶ ............................................. B60H 1/34
[52] U.S. Cl. ........................................ 454/154; 454/326
[58] Field of Search ................... 454/154, 286, 454/326, 336

[56] References Cited

U.S. PATENT DOCUMENTS

| | | | |
|---|---|---|---|
| 5,733,189 | 3/1998 | Eastwood | 454/286 X |
| 5,746,651 | 5/1998 | Arajs et al. | 454/154 |

FOREIGN PATENT DOCUMENTS

| | | | |
|---|---|---|---|
| 24 42 946 | 3/1976 | Germany | 454/154 |

*Primary Examiner*—Harold Joyce
*Attorney, Agent, or Firm*—David B. Kelley

[57] ABSTRACT

An air vent for a heating or air conditioning system comprising an air flow nozzle having a part spherical outer wall mounted within a housing which is substantially circular in cross section about a longitudinal axis and shaped to allow swivelling of the nozzle within it, the nozzle being mounted to the housing via a gimbal member, the gimbal member comprising two legs with a web extending between them, each leg extending between the housing and the nozzle wall in a longitudinal direction, each leg being pivotally attached to the housing at diametrically opposite points such that the gimbal member may rotate about a first axis with respect to the housing, the gimbal member also comprising a tongue extending from the web to the first axis between the pivot points of the housing and being pivotally attached to the nozzle about a second axis orthogonal to the first axis.

9 Claims, 3 Drawing Sheets

AIR VENT FOR A HEATING OR AIR CONDITIONING SYSTEM

FIELD OF THE INVENTION

The invention relates to an improved air vent for a heating or air conditioning system, and is applicable with particular advantage for use in a motor vehicle.

BACKGROUND OF THE INVENTION

Most motor vehicles include air vents which include a mechanism for directing air flow from the vent. One such design comprises an "eyeball-type" vent comprising a part spherical nozzle capable of swivelling within a part spherical housing. Various mechanisms have been proposed for providing universal rotation of the nozzle with respect to the housing. One example of such a mechanism is a gimbal which is pivotally mounted to the housing about a first axis and the nozzle is pivotally mounted to the gimbal about a second axis orthogonal to the first axis.

One example of such an air vent is described in UK Patent 1 478 226 in which an annular gimbal ring surrounds the spherical surface of the nozzle shell and lies within the housing and is pivotally connected at diametrically opposite regions to the nozzle shell and pivotally connected at diametrically opposite regions to the housing with the respective pivot connections pivoting on axes in the same plane but at right angles to each other. The gimbal ring must be carefully fitted between the housing and the nozzle and the alignment of the four pivot connections must be accurate for proper operation.

SUMMARY OF THE INVENTION

According to the invention there is provided an air vent for a heating or air conditioning system comprising an air flow nozzle having a part spherical outer wall mounted within a housing which is substantially circular in cross section about a longitudinal axis and shaped to allow swivelling of the nozzle within it, the nozzle being mounted to the housing via a gimbal member, the gimbal member comprising two legs with a web extending between them, each leg extending between the housing and the nozzle wall in a longitudinal direction, each leg being pivotally attached to the housing at diametrically opposite points such that the gimbal member may rotate about a first axis with respect to the housing, the gimbal member also comprising a tongue extending from the web to the first axis between the pivot points of the housing and being pivotally attached to the nozzle about a second axis orthogonal to the first axis.

Thus instead of the gimbal mechanism comprising a ring, the member comprises two legs which are slipped between the housing and the nozzle with a central tongue which extends to a point between the legs for pivotally mounting to the nozzle. The arrangement is such that the intersection of the first and second axes is on the longitudinal axis.

Preferably the legs are arcuate at their end but the rest of the member need only be shaped to ensure no fouling of any other features of the air vent.

However preferably the legs and web of the gimbal member together define a semicircular rim.

Preferably the gimbal member is planar bisecting the nozzle. This is of particular advantage where the air vent includes a shutter mechanism for controlling the volume of air flowing through the nozzle.

Preferably the tongue includes outwardly opposed projections and the nozzle includes two parallel walls in the region of its centre between which the tongue slides, the wall including two bores through which the projections pass.

Preferably the gimbal member is a unitary member moulded from plastics. Preferably the plastics is a springy material so that the legs snap fit into position in the housing for easy fitting.

Preferably the housing includes diametrically opposed slots into which the legs may slide which act as guide means.

BRIEF DESCRIPTION OF THE DRAWING

An air vent in accordance with the invention will now be described with reference to the accompanying drawings in which.

DESCRIPTION OF THE PREFERRED EMBODIMENT

Figure 1:
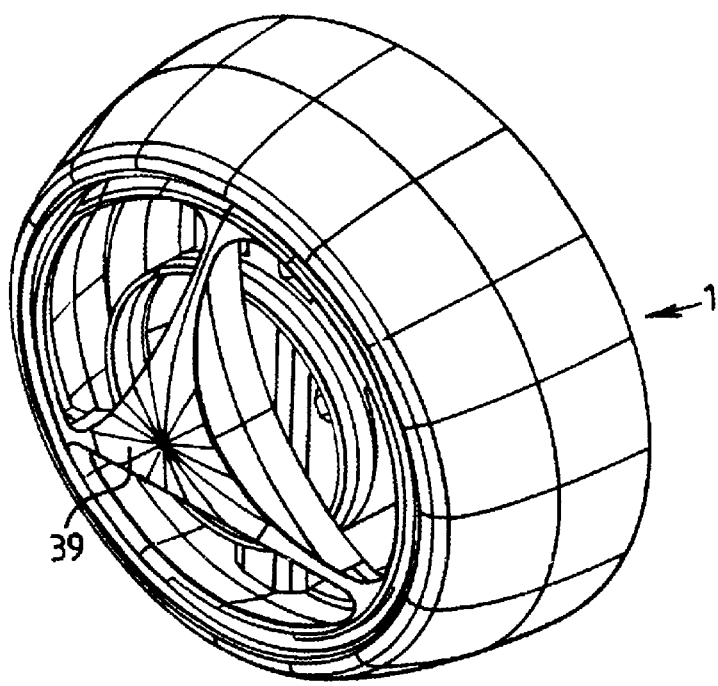
FIG. 1 is a perspective view of an air vent in accordance with the invention.
Figure 2:
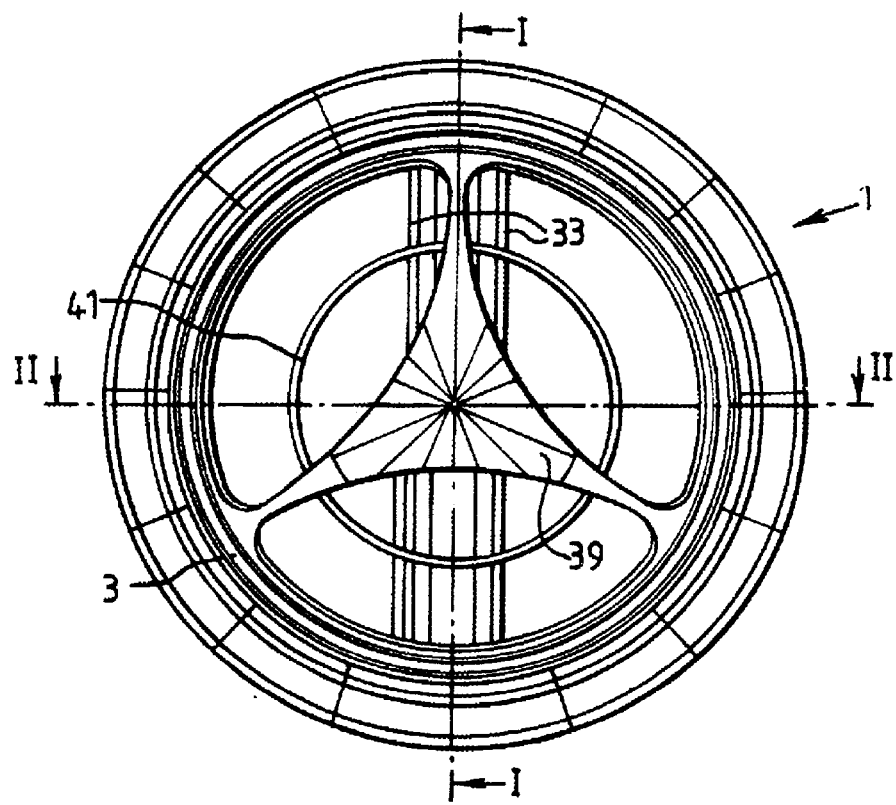
FIG. 2 is a front view of the air vent.
Figure 3:
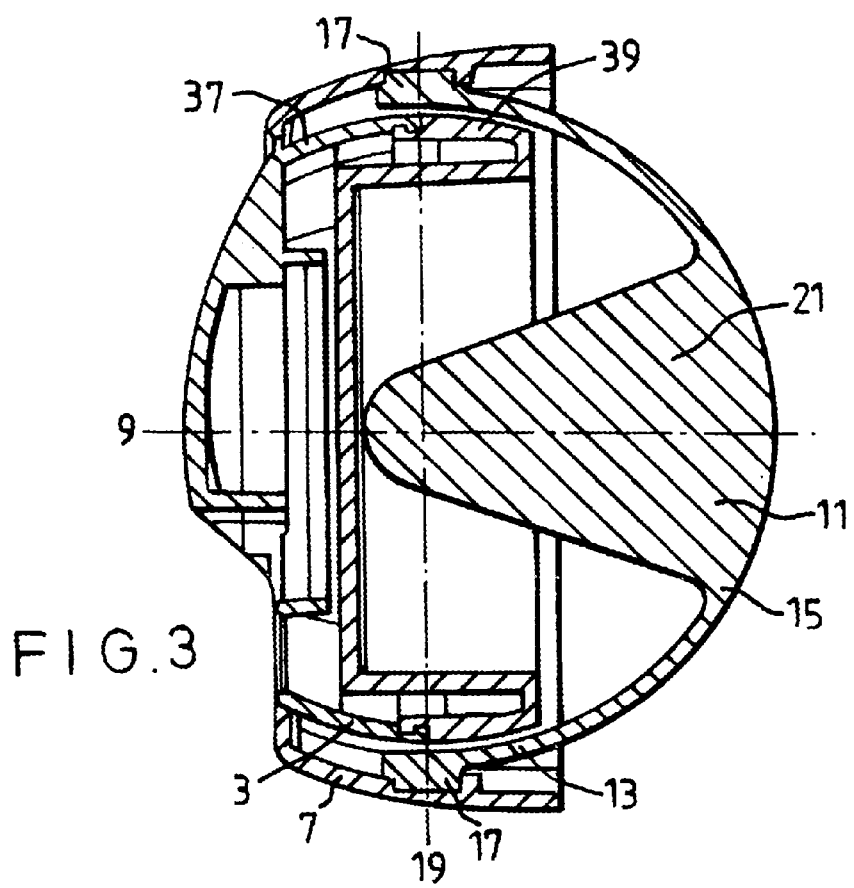
FIG. 3 is a sectional elevation along line I—I in direction A of FIG. 2.
Figure 4:
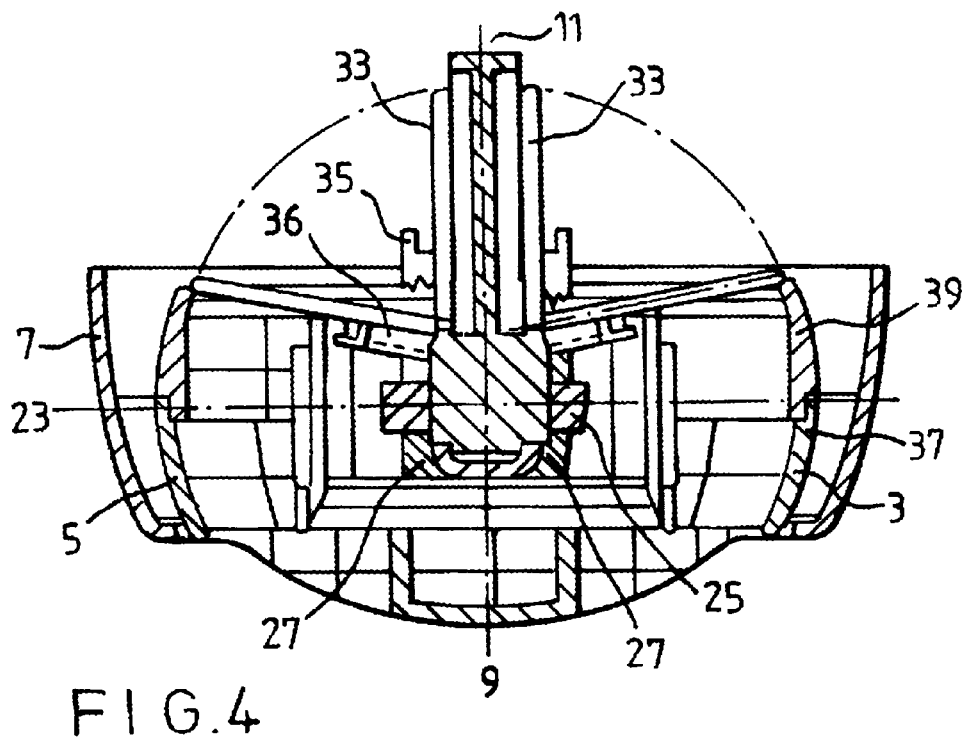
FIG. 4 is a sectional elevation along line II—II in direction B of FIG. 2.

An air vent 1 for a heating or air conditioning system comprises an air flow nozzle 3 having a part spherical outer wall 5 mounted within a housing 7 which is substantially circular in cross section about a longitudinal axis 9 and shaped to allow swivelling of the nozzle 3 within it. The nozzle 3 is mounted to the housing 7 via a gimbal member 11. The gimbal member 11 comprises two legs 13 with a web 15 extending between them, each leg 13 extending between the housing 7 and the nozzle wall 5 in a longitudinal direction. Each leg 13 is pivotally attached to the housing 7 at diametrically opposite points 17 such that the gimbal member 11 may rotate about a first axis 19 with respect to the housing 7. The gimbal member 11 also comprises a tongue 21 extending from the web 15 to the first axis 19 between the pivot points 17 of the housing and being pivotally attached to the nozzle about a second axis 23 orthogonal to the first axis 19.

Figure 5:
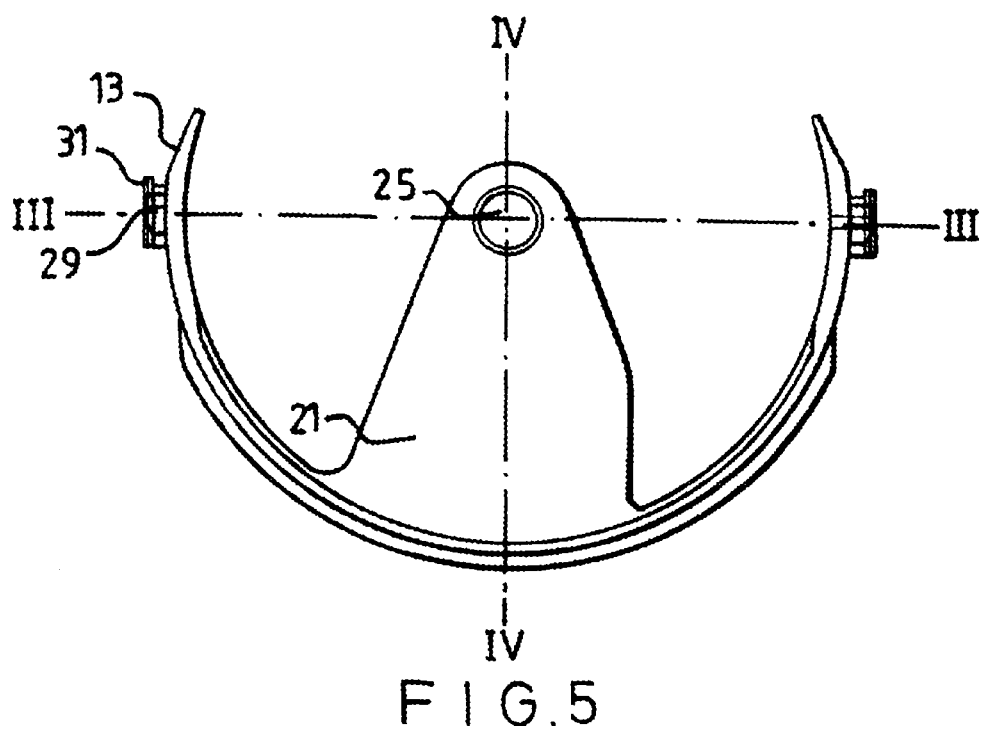
FIG. 5 is a detailed view of the gimbal member.
Figure 6:
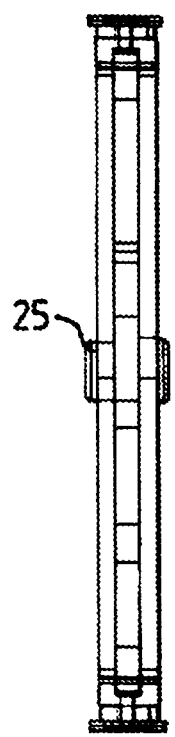
FIG. 6 is a sectional elevation along line III—III of FIG. 5.
Figure 7:
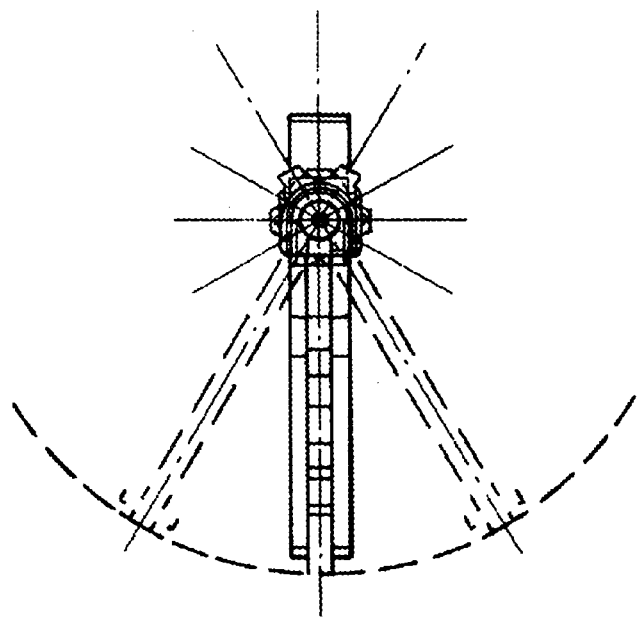
FIG. 7 is a sectional elevation along line IV—IV of FIG. 5.

The gimbal member is illustrated schematically only in FIGS. 1 to 4 and is shown in detail in FIGS. 5 to 7. As can be seen the legs 13 are arcuate and in fact the web and legs together define a semicircular rim. The gimbal member is generally planar and of a unitary moulded plastics unit.

The tongue includes outwardly opposed bosses 25 which are used to pivotally mount the nozzle 3. The nozzle 3 includes two central parallel plates 27 including a circular bore into which the boss may be inserted. The nozzle, may then be rotated about the bosses 25.

The housing 7 includes a pair of diametrically opposed longitudinally extending grooves (not shown). The leg 13 includes an outwardly extending pin 29 onto which is pushfitted a U-shaped rotatable bracket 31. The bracket 31 may be slid into the groove in the housing and then when in this position the pin 29 may rotate with respect to the bracket 31 so that the gimbal member rotates with respect to the housing.

The gimbal member is moulded from a resilient springy plastics so that the gimbal member bears against the housing for it to be firmly held in position.

The air flow nozzle 3 includes means to vary the volume of air flow. These comprise a pair of rotatable shutters 33 each of which is a semicircular disc, and each including an arcuate guide 35.

The nozzle is in two parts 37 and 39 which are mutually rotatable about the longitudinal axis 9. The outer part includes a depending pin (not shown) which engages the arcuate guide 35. Rotation of the outer part 37 moves the pin in the guide 35 to cause opening and closing of the shutters 33.

The outer part 37 includes central member 39 at its hub which is coupled to its outer edge by three webs. The central member acts as a handle which can be grasped to allow rotation of the part 37.

The nozzle also includes a cylindrical guide 41 which straightens the air flow.

What is claimed is:

1. An air vent for a heating or air conditioning system in an automotive vehicle comprising an air flow nozzle having a part spherical outer wall mounted within a housing which is substantially circular in cross section about a longitudinal axis and shaped to allow swivelling of the nozzle therein, the nozzle being mounted to the housing via a gimbal member, the gimbal member comprising two legs with a web extending therebetween, each leg extending between the housing and the nozzle wall in a longitudinal direction, each leg being pivotally attached to the housing at diametrically opposite points such that the gimbal member may rotate about a first axis with respect to the housing, the gimbal member also comprising a tongue extending from the web to the first axis between the pivot points of the housing and being pivotally attached to the nozzle about a second axis orthogonal to the first axis.

2. An air vent according to claim 1, in which the legs of the gimbal member are arcuate.

3. An air vent according to claim 2, in which the legs and the web of the gimbal member define a semicircular rim.

4. An air vent according to claim 1, in which the gimbal member is generally planar.

5. An air vent according to claim 4, in which the tongue includes two outwardly opposed bosses for forming the pivotal connection with the nozzle.

6. An air vent according to claim 1, in which the housing includes two diametrically opposed longitudinal grooves into which may be slid a projection on each leg for installation.

7. An air vent according to claim 1, in which the gimbal member is of a resilient springy plastic such that the legs bear against the housing.

8. An air vent according to claim 1, in which the nozzle has pivotally mounted to it a pair of shutters which are used to vary the volume of air flow.

9. An air vent according to claim 8 in which the shutters are planar and semicircular.

* * * * *